Oct. 3, 1944.   W. BAUSCH   2,359,609
OPTICAL INSTRUMENT
Filed March 10, 1943
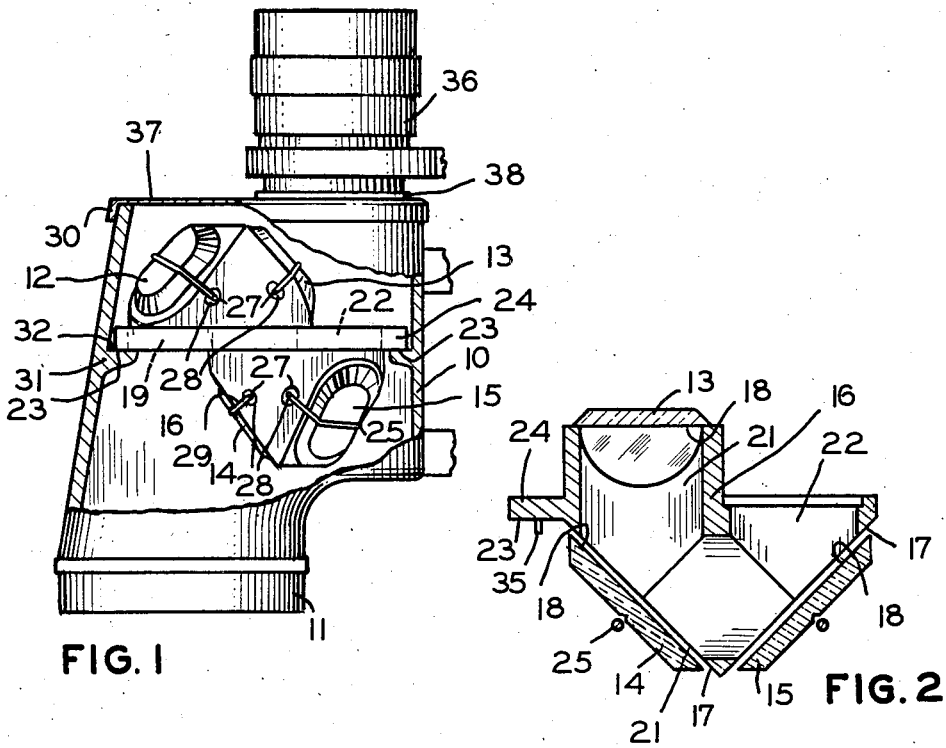
FIG. 1
FIG. 2
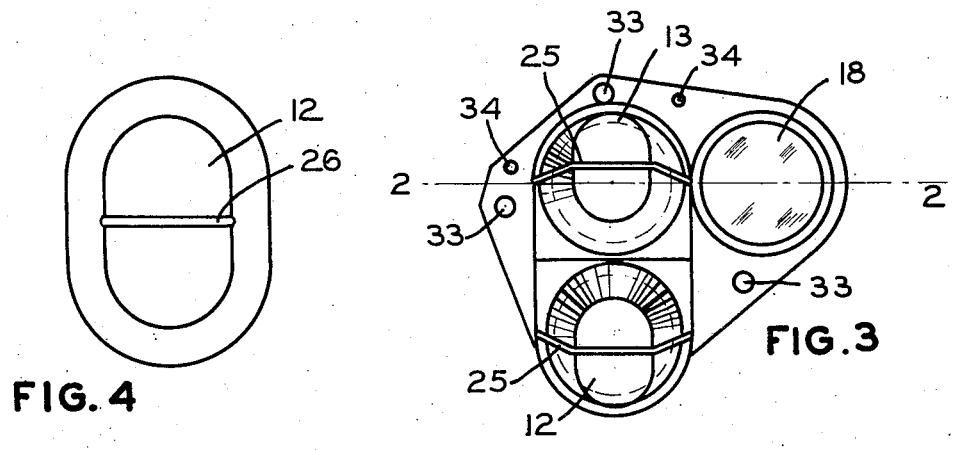
FIG. 4
FIG. 3
WILLIAM BAUSCH
INVENTOR
BY
ATTORNEYS

Patented Oct. 3, 1944

2,359,609

UNITED STATES PATENT OFFICE 2,359,609

OPTICAL INSTRUMENT

William Bausch, Rochester, N. Y., assignor to Bausch & Lomb Optical Company, Rochester, N. Y., a corporation of New York Application March 10, 1943, Serial No. 478,632

4 Claims. (Cl. 88—34)

This invention relates to optical instruments and more particularly to instruments employing an erecting system for erecting the inverted image formed by the lens system of the instrument.

In certain optical instruments, particularly binoculars and like instruments, a prism system is used to erect the inverted image formed by the lens system of the instrument. The prism system generally comprises a pair of Porro prisms having their hypotenuse faces parallel and their apices on opposite sides of a plane intermediate said hypotenuse faces and parallel thereto. In such a system, the apex lines of the prisms are at right angles to each other and light is reflected by the four equal faces of the prisms.

Although such an erecting system is far superior to a lens erecting system, they are objectionable in that the prisms are difficult to form, considerable skill must be exercised in mounting the same within the instrument and the glass of the prisms greatly increases the weight of the instrument.

It has been heretofore proposed, in an effort to circumvent the objections to a prism erecting system but yet retain the desired features thereof, to mount a plurality of reflectors in spaced relationship so that a ray will be reflected as a ray is reflected in passing through a Porro system. These prior proposals have not been successful for a number of reasons, the principal reason being that it was extremely difficult to rigidly and permanently mount the reflectors within the body member of the instrument.

In the device of the present invention, the previously used Porro system is replaced by a plurality of reflectors having at least one plano face and mounted in predetermined angularly disposed planes for erecting the image inverted by the lens system. The reflectors are removably mounted on a carrier member having a plurality of uniplanar facets which locate the planes of the reflectors relative to a fiducial plane on the carrier. The facets of the carrier are grouped in two pairs, the surfaces of each pair being formed normal to each other with the apices projecting in opposite directions and the apex line of one pair being normal to the line of the other pair. The carrier is formed with a plurality of light passages, one of the passages forming an entrance passage, leading to a facet and light rays are reflected through the carrier in the same manner as a Porro system reflects a ray incident on one hypotenuse of a prism of the system.

The fiducial plane of the carrier may comprise a uniplanar surface or a plurality of coplanar surfaces formed on the carrier for engaging coplanar seats formed within the body member of the instrument. The seats of the body member are accurately formed relative to some reference plane formed on the body member so that the carrier, when mounted within the body member with the uniplanar surface or coplanar surfaces engaging the seats, will be held in the desired position relative to the reference plane of the body member.

As the reflectors are mounted in facewise engagement with the facets of the carrier in predetermined positions relative to the fiducial plane of the same and the carrier is rigidly secured within the body member of the instrument with the fiducial plane thereof in a fixed position relative to the reference plane of the body member, the reflectors will be permanently held in the desired position relative to the reference plane of the body member.

As the carrier can be formed of some lightweight alloy or plastic material of sufficient rigidity, the desired features of the previously used Porro systems are retained without the objectionable increased weight of the glass of the prisms. The carrier can be formed integrally and, if desired, the same may be die-cast to approximate final shape.

To eliminate the double image formed by partial reflection on the front surface of rear surface reflectors, the reflecting surfaces of the reflectors of the instrument of the present invention are formed on the front surface thereof. Such a reflecting surface as used in the present invention is superior to the prism as the absorption of light by the four mirrors is substantially less than the absorption by the prisms of the previously used systems.

Other objects and advantages of the present invention will appear from the following description taken in connection with the accompanying drawing in which:

Fig. 1 is an elevational view partly in section of one unit of the binocular embodying the improvements of the present invention.

Fig. 2 is a section taken along line 2—2 of Fig. 3 showing some of the reflectors displaced from the locating surfaces of the carrier.

Fig. 3 is a top plan view of the carrier with the reflectors mounted thereon.

Fig. 4 is a top plan view of one of the reflectors.

The device of the present invention, for the purpose of illustration, has been shown as a binocular and, for convenience of illustration, only one body unit of the instrument has been illustrated. The instrument comprises the usual body member 10 to which are mounted the optical elements of the instrument. The optical elements of the instrument include an objective assembly 11, mounted to one end of the body member 10 by means of an eccentric ring such as disclosed in U. S. Patent No. 959,739 which permits the objective to be rotated to laterally adjust the optical axis thereof.

The means for erecting the inverted image formed by the objective comprises as shown a plurality of reflectors 12, 13, 14 and 15 mounted on a carrier member 16. Although the carrier member 16 may be formed in a number of ways, in the preferred embodiment of the present invention, this member is die-cast as an integral piece to approximate finished form. A plurality of uniplanar surfaces 17 are accurately ground on the carrier member 16 and the surfaces are used to locate the plane reflecting surfaces 18 of the reflectors.

Although the reflecting surfaces can be formed in any manner desired, in the method now preferred, each reflecting surface 18 is formed by depositing on the plano face of a body, preferably formed of glass, a suitable metal such as aluminum by a high vacuum evaporation process. In accordance with this process, a reflecting surface can be formed on the optically plane glass surface of the body of the reflector which will reflect light to the degree of perfection required and which is extremely slow to tarnish when exposed to the air. Such a reflecting surface is superior to the internal reflecting surfaces of the Porro prisms heretofore used, in that the absorption of light by the reflecting surfaces of the reflectors of the present invention is substantially less than that absorbed by the Porro prisms.

The reflectors are mounted on the carrier 16 with the reflecting surfaces 18 facing each other and the carrier is formed with an entrance passage 19 through which a light ray may enter the carrier to be successively reflected through passages 21 interconnecting the reflectors in the same manner that a light ray is reflected through a Porro prism system. Thus light entering the entrance passage 19 and incident on the reflector 12 will be reflected through the passages 21 to the reflector 15 and thence out of the carrier 16 through the exit passage 22.

As the locating surfaces 17 of the carrier are accurately formed uniplanar and precisely located relative to a fiducial plane, located in the now preferred embodiment of the present invention by a uniplanar surface 23 formed on the underneath surface of a flange 24 of the carrier 16, light entering the entrance passage 19 will emerge through exit passage 22 as rays parallel to the rays entering the carrier. Moreover, the image, due to the four reflections, will have been inverted again so that the ocular system of the instrument will view the image as erect. If desired, the fiducial plane can be located by means of coplanar surfaces of pads carried by the flange 24. This form of the locating means would lessen the surface area to be finished.

Although any means desired can be used to hold the plane reflecting surfaces 18 of the reflectors against the surfaces 17 of the carrier, in the now preferred embodiment of the present invention resilient U-shaped clips 25 are employed to clamp the reflectors in position on the locating surfaces 17. Each clip saddles a reflector, the bow of the U being received in a groove 26 cut, as best shown in Fig. 4, in the rear surface of the reflector and the ends thereof are formed with detent members 27 engaged in small notches 28 formed in the outer walls of the carrier 16 adjacent to the locating surfaces 17. To hold the clips 25 against pivotal movement about the axis defined by the two ends thereof, grooves 29 are formed in the outer walls of the carrier for receiving the legs of the clips. It will be seen that the clips, after the members 27 are engaged in the notches 28, hold the reflectors to the carriers with the reflecting faces 18 in good engagement with the locating surfaces 17.

Although the clips 25 will securely hold the reflectors to the carrier 16, yet the same allow the reflectors to be removed from the carrier if it should become necessary to replace a reflector. As the reflecting surfaces are preferably formed by depositing aluminum or some suitable metal on the surface by a high vacuum process, the surface will give excellent results for a considerable period of use. It will be noted that the reflecting surface is carrier by the front surface of the reflector and that any double images caused by the partial reflection at the front surface of a rear surface reflector is obviated.

The surface 23 of the flange 24 is used in the present invention to mount the carrier 16 within the body member 10 in a predetermined position relative to the end surface 30 of the body member 10 which forms a reference plane for the optical elements of the instrument. To support the carrier 16 within the body member 10, the wall of the latter has integrally formed therewith a plurality of lugs 31, the upper surfaces 32 of which are carefully ground coplanar and parallel with the end surface 30. As the surface 23 of the flange 24 is uniplanar, the reflectors will be held within the body member in a predetermined position relative to the end surface 30 when the surface 23 is brought into engagement with the surface 32 of the lugs 31. The carrier is held to the lugs 31 through screws passed through suitable apertures 33 formed in the flange 24.

To accurately locate the carrier within the body member 10, sockets are spotted in the lugs 31 through holes 34 formed in the flange 24. The holes take the one end of dowel pins 35, the opposite ends of which are received in the holes spotted in the lugs 31, and thereafter the holding screws are tightened to hold the carrier rigidly on the lugs.

The ocular system of the instrument, although it has not been shown, is mounted within a mounting tube 36, the one end of which is passed through an opening in the closing cap 37 and threaded into a suitable socket generally formed integral with the body member 10. If desired, the tube 36 can be formed integral with the cap 37 although in the preferred embodiment of the instrument, the tube is mounted as just described.

The cap 37 is formed on its interior surface with a uniplanar surface which engages the reference surface 30 of the body member when the cap 37 is secured thereto. The mounting tube 36 is located relative to the cap 37 through a collar 38 so that the surface of the cap 37, when engaged with the surface 30 of the body 10, will insure that the mounting tube and the ocular system carried thereby will be in the proper position relative to the other optical elements of the instrument.

While one embodiment of the invention has been disclosed, it is to be understood that the invention need not be limited to the device described but is susceptible of modifications falling within the spirit of the invention and the scope of the appended claims.

I claim:

1. In an optical instrument of the type described, a body member; a plurality of reflectors; integral means for mounting said reflectors in predetermined spaced angular positions relative to each other, said mounting means comprising a faceted carrier, the facets of said carrier being connected by passages opening onto the same; means for holding a reflector on each facet of said carrier; a flange formed integral with said carrier and at least partly circumscribing the same, one face of said flange being formed uniplanar; and means for holding the uniplanar face of said flange in a fixed position relative to a predetermined axis of said body member.

2. In an optical instrument of the type described, a body member; a plurality of uniplanar seats within said body member; a plurality of uniplanar front surface reflectors; a carrier member for supporting said reflectors; an outwardly extending flange carried by said carrier member and at least partly circumscribing the same, a surface of said flange being formed uniplanar and establishing a fiducial plane; means for holding said reflectors on said carrier member in predetermined angular positions relative to said fiducial plane, said means comprising a plurality of plano surfaces formed on said carrier member and means for holding front surface of one of said reflectors against each of said plano surfaces; and means for holding said carrier member within said body member with uniplanar surface of said flange in face-wise engagement with said seats.

3. In an optical instrument of the type described, a body member; a plurality of front surface reflectors; integral means for mounting said reflectors in predetermined spaced angular positions relative to each other within said body member, said mounting means comprising a faceted carrier, the facets of said carrier being uniplanar and connected by passages opening onto the same; and means for removably holding the front surface of one of said reflectors against each facet of said carrier, said means comprising a plurality of U-shaped clips, the legs of each clip being frictionally engaged in notches formed in the walls of said carrier and holding the bow of said clip against the rear surface of the reflector.

4. In an optical instrument of the type described, a body member; a plurality of front surface reflectors having a groove extending across the rear surface thereof; integral means for mounting said reflectors in predetermined spaced angular positions relative to each other within said body member, said mounting means comprising a faceted carrier, the facets of said carrier being uniplanar and connected by passages opening onto the same; and means for removably holding the front surface of one of said reflectors against each facet of said carrier, said means comprising a plurality of resilient U-shaped clips, the legs of each clip frictionally engaging notches formed in the walls of said carrier with the bow of said clip in the groove of a reflector and resiliently urging the reflector against the facet engaged by the front surface thereof.

WILLIAM BAUSCH.